US009248585B2

(12) United States Patent
Takamoto et al.

(10) Patent No.: US 9,248,585 B2
(45) Date of Patent: Feb. 2, 2016

(54) GRANULATION METHOD USING AN UNDERWATER CUTTING (UWC) DEVICE (75) Inventors: Seiji Takamoto, Hiroshima (JP); Fumio Kobayashi, Hiroshima (JP); Reo Fujita, Hiroshima (JP); Shigeki Inoue, Hiroshima (JP); Junichi Iwai, Hiroshima (JP)

(73) Assignee: THE JAPAN STEEL WORKS, LTD., Tokyo (JP)

(*) Notice: Subject to any disclaimer, the term of this patent is extended or adjusted under 35 U.S.C. 154(b) by 565 days.

(21) Appl. No.: 13/697,634

(22) PCT Filed: May 12, 2011

(86) PCT No.: PCT/JP2011/060991
§ 371 (c)(1),
(2), (4) Date: Nov. 13, 2012

(87) PCT Pub. No.: WO2011/142434
PCT Pub. Date: Nov. 17, 2011

(65) Prior Publication Data
US 2013/0062804 A1    Mar. 14, 2013

(30) Foreign Application Priority Data
May 14, 2010    (JP) .................................. 2010-111657

(51) Int. Cl.
B29C 47/78    (2006.01)
B29B 9/06    (2006.01)
(Continued)

(52) U.S. Cl.
CPC . B29B 9/065 (2013.01); B01J 2/20 (2013.01); B29C 47/364 (2013.01);
(Continued)

(58) Field of Classification Search
None
See application file for complete search history.

(56) References Cited

U.S. PATENT DOCUMENTS

2004/0082690 A1    4/2004    Kawahara et al.
2004/0147674 A1    7/2004    Kakeda et al.
(Continued)

FOREIGN PATENT DOCUMENTS

CN    101693782 A    4/2010
DE    102004002401 A1    8/2005
(Continued)

OTHER PUBLICATIONS

International Search Report dated Aug. 16, 2011 from the International Searching Authority in counterpart application No. PCT/JP2011/060991.
(Continued)

Primary Examiner — Edmund Lee
(74) Attorney, Agent, or Firm — Sughrue Mion, PLLC (57) ABSTRACT An object of the invention is to provide a granulation method and a granulation apparatus that can reduce the manufacturing costs of pellets. There is provided a granulation method which uses an underwater cutting (UWC) device 107 that cuts a medium to be processed extruded from holes of a die 106 by using cutter blades provided in a circulation box 109 and conveys the cut pellets from the circulation box 109 while cooling the cut pellets by pellet cooling/transport water (PCW). The granulation method includes circulating the PCW and stopping the circulation of the PCW after pushing the cutter blades against the die 106 while rotating the cutter blades, before the start of the granulation; storing a predetermined amount of PCW in the circulation box 109 by discharging the PCW; and heating the PCW, which is stored in the circulation box 109, up to 69° C. or more.

8 Claims, 7 Drawing Sheets (51) Int. Cl.
  *B01J 2/20* (2006.01)
  *B29C 47/60* (2006.01)
  *B29C 47/92* (2006.01)
  *B29C 47/00* (2006.01)
  *B29C 47/08* (2006.01)
  *B29C 47/30* (2006.01)
  *B29C 47/36* (2006.01)
  *B29C 47/68* (2006.01)
  *B29C 47/76* (2006.01)
  *B29C 47/86* (2006.01)

(52) U.S. Cl.
  CPC ............ *B29C 47/6062* (2013.01); *B29C 47/92* (2013.01); *B29C 47/0011* (2013.01); *B29C 47/0813* (2013.01); *B29C 47/0815* (2013.01); *B29C 47/0866* (2013.01); *B29C 47/30* (2013.01); *B29C 47/367* (2013.01); *B29C 47/68* (2013.01); *B29C 47/767* (2013.01); *B29C 47/864* (2013.01); *B29C 2793/009* (2013.01); *B29C 2947/92019* (2013.01); *B29C 2947/92209* (2013.01); *B29C 2947/92409* (2013.01); *B29C 2947/92476* (2013.01); *B29C 2947/92523* (2013.01); *B29C 2947/92571* (2013.01); *B29C 2947/92704* (2013.01); *B29C 2947/92961* (2013.01); *B29C 2947/92971* (2013.01)

(56) References Cited

U.S. PATENT DOCUMENTS

2006/0110777 A1* 5/2006 Cochran et al. ........ C07K 1/047
  435/7.1
2010/0102467 A1* 4/2010 Waggoner et al. ...... B29B 9/065
  264/12
2010/0320628 A1* 12/2010 Holmes .................. B29B 9/065
  264/5

FOREIGN PATENT DOCUMENTS

| | | | |
|---|---|---|---|
| DE | 102011079028 A1 | | 1/2012 |
| EP | 1 676 884 A1 | | 7/2006 |
| JP | 10-58445 | * | 3/1998 |
| JP | 1058445 A | | 3/1998 |
| JP | 11179724 A | | 7/1999 |
| JP | 2006110777 A | | 4/2006 |
| JP | 200929032 A | | 2/2009 |
| WO | 2006041098 A1 | | 4/2006 |
| WO | WO2006/041098 | * | 4/2006 |

OTHER PUBLICATIONS

Written Opinion dated Aug. 16, 2011 from the International Searching Authority in counterpart application No. PCT/JP2011/060991.
Communication dated Jun. 30, 2014 issued by the State Intellectual Property Office of the People's Republic of China in counterpart Chinese Patent Application No. 20118002411.0.
Search Report dated Oct. 16, 2013, issued by the European Patent Office in counterpart European Application No. 11780691.9.

* cited by examiner

| | GRANULATION METHOD | MFR | TEMPERATURE OF RESIN ON UPSTREAM SIDE IMMEDIATELY AHEAD OF DIE (°C) | DIE HOLE-APERTURE RATIO (%) |
|---|---|---|---|---|
| EXAMPLE 1 | A | 0.25 | 213 | 100 |
| EXAMPLE 2 | A | 1.7 | 211 | 100 |
| EXAMPLE 3 | A (*1) | 1.7 | 210 | 100 |
| EXAMPLE 4 | A | 8 | 203 | 100 |
| COMPARATIVE EXAMPLE 1 | B | 0.5 | 241 | 44 |
| COMPARATIVE EXAMPLE 2 | B | 6 | 206 | 23 |

*1: THE EXTRUSION OF POLYPROPYLENE WAS STOPPED WITHOUT THE SEPARATION OF UWC DEVICE FROM THE DIE AFTER THE END OF THE EVALUATION OF EXAMPLE 2, PCW WAS DISCHARGED UP TO A DEFINED VALUE, AND PELLETS WERE GRANULATED AGAIN UNDER THE SAME CONDITIONS AS EXAMPLE 2.

FIG. 3

|  | PCW HEATING TEMPERATURE (°C) | DIE HOLE-APERTURE RATIO (%) |
|---|---|---|
| EXAMPLE 5 | 69 | 91 |
| EXAMPLE 6 | 71 | 89 |
| COMPARATIVE EXAMPLE 3 | 64 | 77 |
| COMPARATIVE EXAMPLE 4 | 66 | 86 |

GRANULATION METHOD USING AN UNDERWATER CUTTING (UWC) DEVICE

TECHNICAL FIELD

The present invention relates to a granulation method and a granulation apparatus that convey pellets formed by an UWC (underwater cutting) device while cooling the pellets.

BACKGROUND ART

Figure 5:
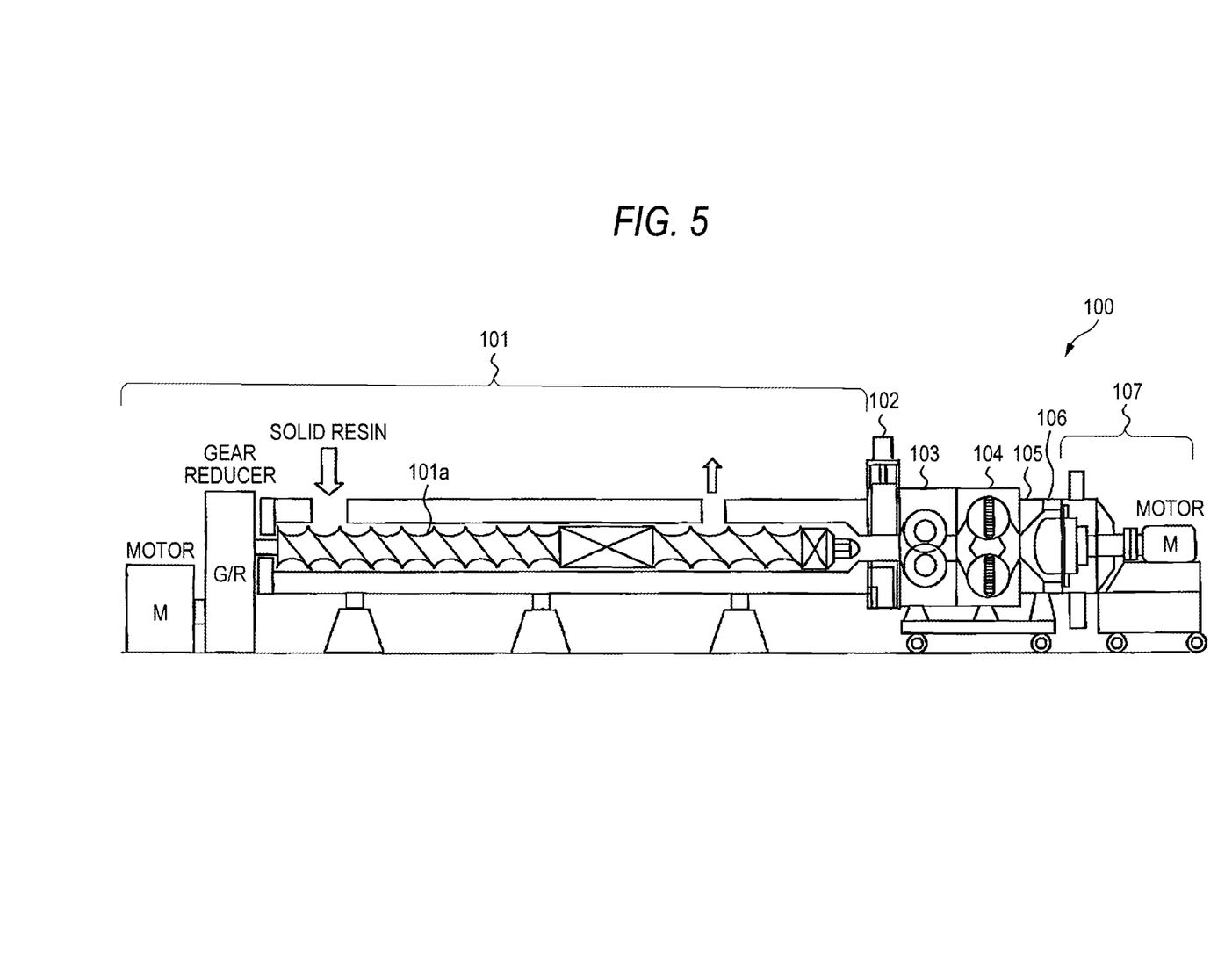
FIG. 5 is a side view showing an example of a plastic plasticizing-kneading-extrusion granulator.

FIG. 5 is a side view showing an example of a plastic plasticizing-kneading-extrusion granulator 100. The plastic plasticizing-kneading-extrusion granulator 100 shown in FIG. 5 includes a plastic plasticizing-kneading machine 101, a diverter valve 102, a gear pump 103, a molten polymer filtering device 104, a die holder 105, a die 106, and a pelletization device (UWC device) 107.

The plastic plasticizing-kneading machine 101 is a device that plasticizes and kneads solid resin. The diverter valve 102 is a device that discharges molten polymer plasticized and kneaded by the plastic plasticizing-kneading machine 101, and can switch a flow channel for molten polymer to a discharge side outside the system or the gear pump 103. The gear pump 103 is a device that transports molten polymer, and has high boosting capability with respect to large pressure loss that is generated at a device as a transport destination.

The molten polymer filtering device 104 is a device that filters out solid impurities contained in the molten polymer. The die holder 105 is a part that connects the molten polymer filtering device 104 with the die 106. A flow channel, which guides the filtered molten polymer to a plurality of holes formed at the die 106, is formed in the die holder 105. The die 106 is a part that forms the filtered molten polymer into a spaghetti shape, and a plurality of holes are circumferentially arranged on the die 106.

The UWC device 107 is connected to the die 106, and includes a circulation box to be described below. Pellet cooling/transport water (PCW) is circulated in the circulation box. The UWC device 107 forms the spaghetti-shaped molten polymer, which is continuously extruded from the holes of the die 106, into fine grains (pellets) by cutter blades that are rotated in the circulation box.

Next, the operation of the plastic plasticizing-kneading-extrusion granulator 100 will be described. In FIG. 5, solid resin is supplied to the plastic plasticizing-kneading machine 101 and is plasticized and melted by the thermal energy obtained from a barrel that can be heated and cooled and shear energy that is applied when a built-in screw 101a is rotated by a motor and a gear reducer. The plasticized and melted plastic is conveyed to the diverter valve 102, which is a downstream device, by the conveying function of the screw 101a that is built in the plastic plasticizing-kneading machine 101. The conveyed molten polymer is conveyed to the molten polymer filtering device 104 and the die holder 105 through the diverter valve 102 by the gear pump 103, and is conveyed to the UWC device 107 through die holes to be described below.

Figure 6:
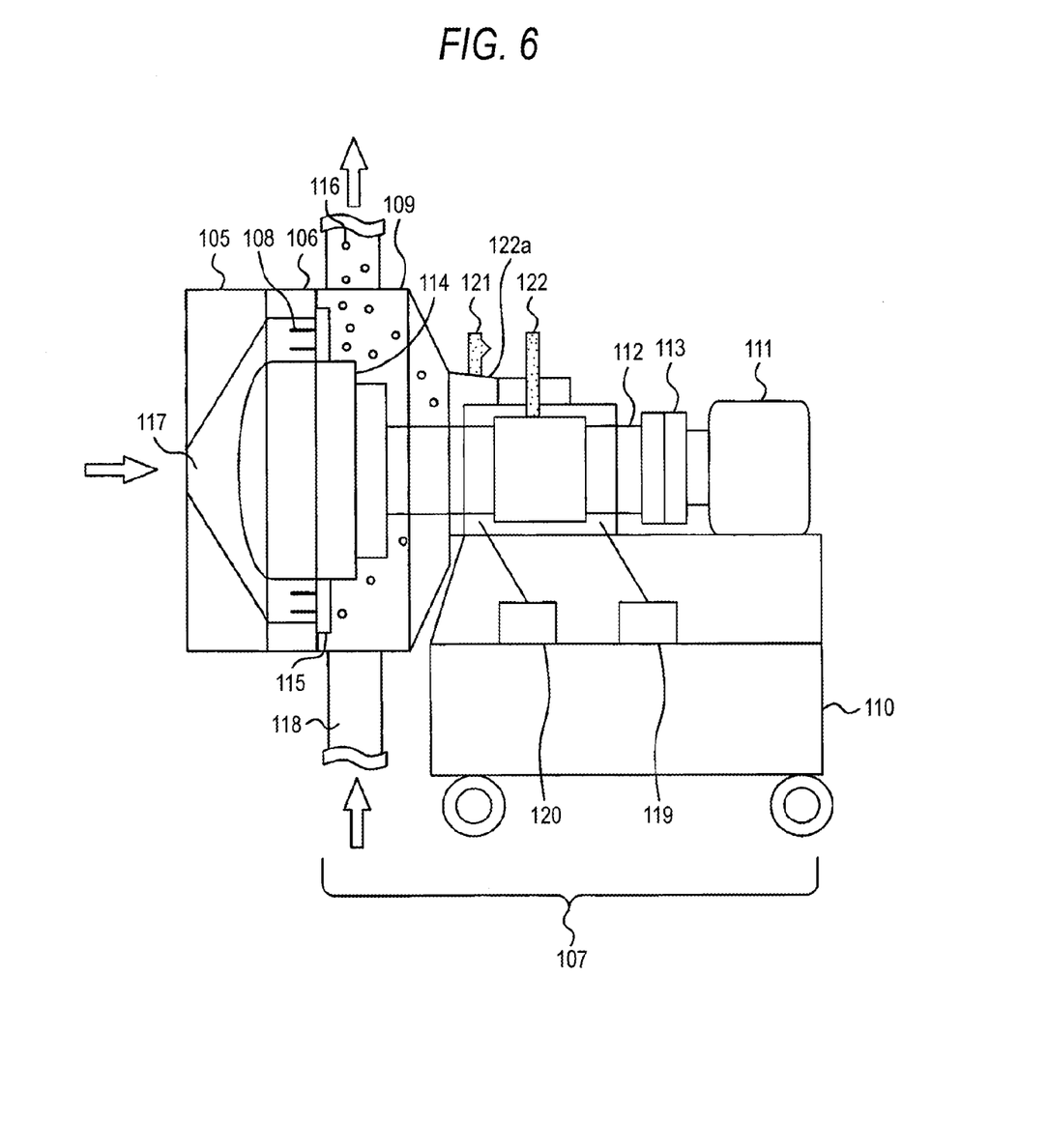
FIG. 6 is a cross-sectional view (inside view) of an underwater cutting (UWC) device during the formation of pellets.

FIG. 6 is a cross-sectional view (inside view) of the UWC device 107 during the formation of pellets. The die holder 105, the die 106 including die holes 108, the UWC device 107, pellets 116, molten polymer 117, and pellet cooling/transport water (PCW) 118 are shown in FIG. 6.

The UWC device 107 includes a circulation box (water chamber) 109, a movable carriage 110, a motor (M) 111, a cutter shaft 112, a coupling 113, a cutter holder 114, cutter blades 115, a forward pressure controller 119, a backward pressure controller 120, a gap measuring unit 121, and a plate 122.

The cutter shaft 112 of the UWC device 107 is rotated by the start-up of the motor 111. At the same time, the cutter blades 115, which are fixed to the cutter shaft 112 through the cutter holder 114, start to be rotationally moved in the circumferential direction. The cutter blades 115 are moved forward or backward by a hydraulic unit or a pneumatic unit (not shown) of the forward pressure controller 119 or the backward pressure controller 120. It is possible to confirm a gap, which is formed between the die 106 and the cutter blades 115, using the plate 122 indirectly fixed to the cutter shaft 112 and the gap measuring unit 121 fixed to a housing 122a.

The molten polymer 117, which is extruded from the die holes 108, is cut to the shape of pellets by the cutter blades 115 and is formed in the circulation box 109 in which the PCW 118 is circulated. Further, the die 106 is heated by a heating medium (steam, hot oil, an electrical heater, or the like). The UWC device 107 includes a hydraulic system (not shown), so that it is possible to fasten the circulation box 109 and the die 106.

Figure 7:
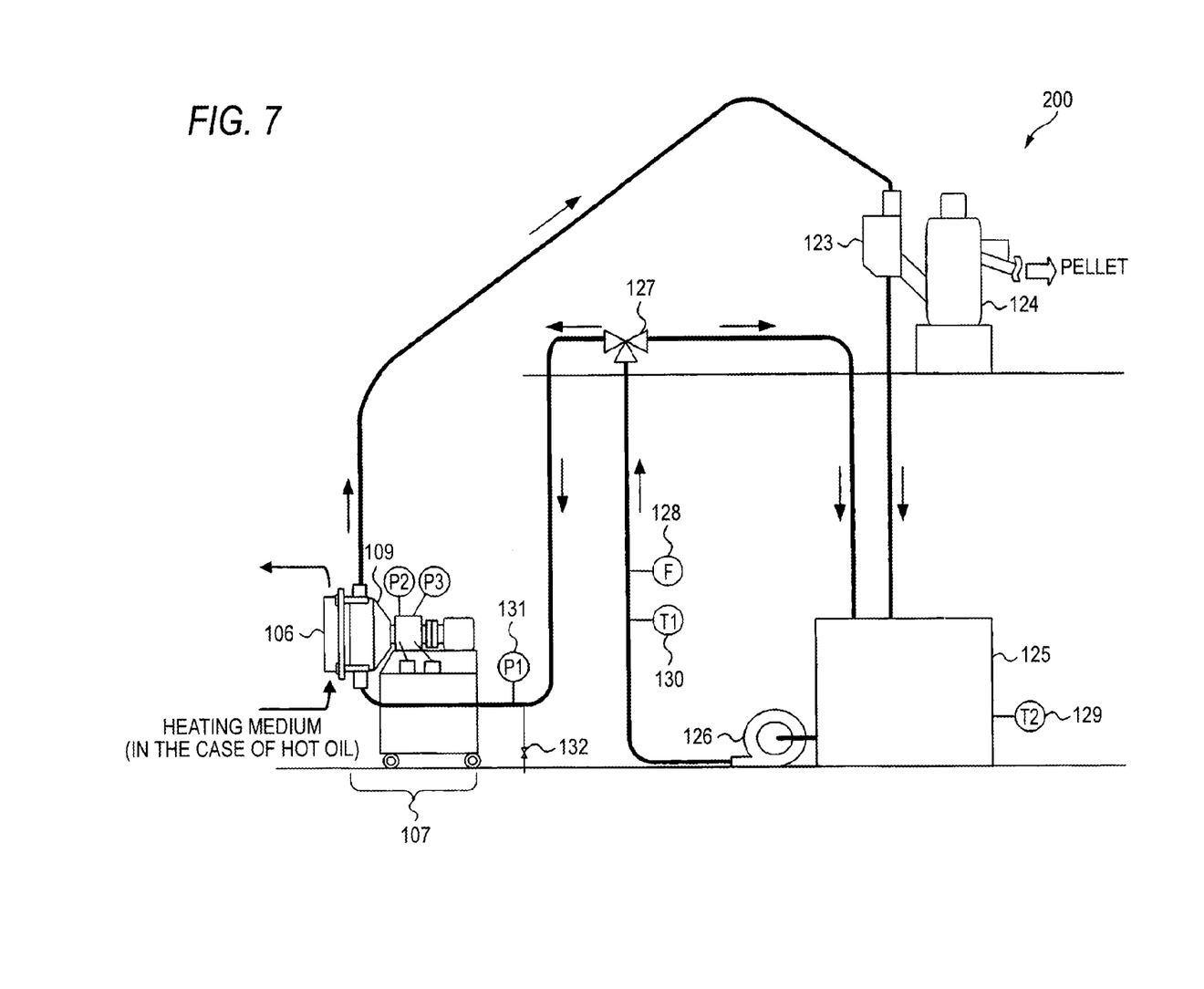
FIG. 7 is a view showing an example of a granulation apparatus according to a related art.

FIG. 7 is a system diagram showing an example of a granulation apparatus 200 in the related art. The granulation apparatus 200 includes a die 106, an UWC device 107, a dehydration screen 123, a centrifugal dehydrator 124, a PCW tank 125, a PCW pump 126, a three-way valve 127, a PCW flow rate detector 128, a detector 129 for internal temperature of the PCW tank, a PCW temperature detector 130, a PCW pressure detector 131, and a manual drain valve 132.

The PCW 118 is circulated in the granulation apparatus 200 by the PCW pump 126. The pellets 116 formed by the UWC device 107 are cooled by the PCW 118 stored in the circulation box 109, are transported to the dehydration screen 123, and are separated from the PCW 118 by the dehydration screen 123 and the centrifugal dehydrator 124. As a result, pellet-like products are obtained.

The flow rate of the PCW 118 is detected by the PCW flow rate detector 128, and is adjusted by a PCW flow rate adjusting valve (not shown). Further, the temperature of the PCW 118 stored in the PCW tank 125 is detected by the detector 129 for internal temperature of the PCW tank, and is adjusted and managed so as to become a setting temperature by a PCW temperature control system (not shown). The temperature of the circulating PCW 118 is detected by the PCW temperature detector 130. The pressure of the PCW 118 during the pelletization is detected by the PCW pressure detector 131.

The following procedure is required when pelletization is started in this granulation apparatus 200.

(1) The UWC device 107 is separated from the die 106, and the die 106 is sufficiently heated by a heating medium.

(2) The plastic plasticizing-kneading machine 101 is started up, molten polymer 117 is discharged from the diverter valve 102 to the outside of the system, and cleaning (purging) is performed in the plastic plasticizing-kneading machine 101.

(3) The gear pump 103 is started up, the diverter valve 102 is switched to the gear pump 103, and it is confirmed that molten polymer 117 is uniformly extruded from die holes 108.

(4) The diverter valve 102 is switched to the discharge side outside the system, and the gear pump 103 is stopped (this state is a state where the molten polymer 117 is discharged from the diverter valve 102).

(5) The UWC device waits until a state where the molten polymer 117 is not discharged from the die holes 108, the cutting surface of the die 106 is quickly cleaned, and the UWC device 107 is connected to the die 106.

(6) The motor 107 of the UWC device 107 starts up and rotates the cutter blades 115.

(7) The rotating cutter blades 115 come into contact with the die 106.

(8) The three-way valve 127 is switched from a state where the PCW 118 is circulated on the bypass side by the PCW pump 126 so that the PCW 118 is supplied to the circulation box 109 of the UWC device 107.

(9) The gear pump 103 is started up, the diverter valve 102 is switched to the gear pump 103, and the molten polymer 117 is extruded from die holes 108 so that the pellets 116 are formed.

(10) The formed pellets 116 are transported to the dehydration screen 123 or the centrifugal dehydrator 124 by the PCW 118, and the PCW 118 attached to the pellets 116 is removed.

In the operations of (7), (8), and (9) of the above-described procedure, the PCW 118 cools and solidifies the molten polymer 117 that is present in the die 106 and the die holes 108. For this reason, there was a problem in that the molten polymer 117 is not extruded. Further, even though the molten polymer 117 is extruded from the die holes 108, there was a problem in that the molten polymer 117 is caught by the cutter blades 115. In order to avoid these problems, there is a method of making the cutter blades 115 come into contact with the die 106 before the molten polymer 117 is extruded from the die holes 108 and extruding the molten polymer 117 before the PCW 118 reaches the die holes 108 and cools the die holes 108.

However, in the above-described granulation apparatus 200, the throughput of one series of devices was about 50 t/h. For this reason, the throughput where pellets 116 having good shape can be formed without the clogging of the die holes 108 is designed to be about 25 t/h. If throughput is lower than 25 t/h, the thermal energy transmitted to the die holes 108 from the molten polymer 117 is insufficient and the temperature of the die holes 108 is lowered due to the thermal energy that is absorbed from the surface of the die 106 by the PCW 118. Accordingly, the molten polymer 117 is solidified in the die holes 108.

For this reason, it is preferable that granulation be started at 25 t/h as the throughput at the time of granulation start. However, since a large amount of molten polymer 117 is discharged from the diverter valve 102 in (4) and (5) of the granulation start procedure, many persons are required to perform the waste disposal of the molten polymer, and a large amount of plastic is scrapped. Further, many workers are concentrated in a small place, and work disorderedly. Furthermore, since feet are covered with a large amount of water and molten polymer 117, footholds are poor. This is not preferable in terms of safety.

In recent years, there has been a need for the throughput of one series of devices of 70 t/h or more. Considering the above-described contents, the throughput at the time of granulation start becomes 35 t/h or more. For this reason, waste disposal is more difficult and the amount of molten polymer 117 to be scrapped is large. Moreover, in order to pelletize a large amount of molten polymer 117, the size of the UWC device 107 is increased and the diameter of the circulation box 109 is also increased. Accordingly, a time, which is required until the circulation box 109 is filled with PCW 118 from an inlet (bottom) of the circulation box 109 to the outlet (ceiling surface) thereof, is lengthened. For this reason, since it is difficult to adjust a timing where the molten polymer 117 is extruded from the die 106 and a timing where the PCW 118 reaches the lower portion of the die 106, it is difficult to perform pelletization.

For example, in the case where pelletization is performed using the PCW 118 that is heated up to 60° C. at a bypass line, the temperature of the PCW 118 cooled by a cold pipe is lowered to a temperature lower than 60° C. when the PCW 118 reaches the lower portion of the circulation box 109. Further, if molten polymer 117 is extruded from the die 106 when the PCW 118 does not reach the vicinity of the lower end portion of the die holes 108 positioned at the lower portion of the die 106, the molten polymer 117 extruded from the upper portion of the die 106 is caught by the cutter blades 115. For this reason, a trouble where the pellets 116 cannot be formed occurs.

On the other hand, if molten polymer 117 is extruded from the die when the circulation box 109 is filled with the PCW 118, the molten polymer 117 present in the die holes 108 formed at the lower portion of the die 106 is solidified since the lower portion of the die 106 is particularly cold, so that clogging occur. If clogging occurs, the shapes of the pellets 116 become irregular and the extrusion speed of the molten polymer 117 to be extruded from the die 106 is increased. Accordingly, long pellets 116 are formed, so that yield is reduced. Further, if the incidence of clogging is increased, the pressure loss of the die 106 is increased and exceeds a design pressure. For this reason, a trouble where operation cannot be performed at a predetermined throughput also occurs.

Accordingly, in order to solve the problems at the time of the pelletization, there has been proposed a granulation apparatus including: a detection unit that detects the temperature of PCW 118 stored in a circulation box 109; and a control unit that controls the temperature of the PCW 118 stored in the circulation box 109 so that the PCW 118 stored in the circulation box 109, which is heated by the die 106, does not boil (for example, see PTL 1).

This apparatus stores the PCW 118 in the circulation box 109, controls heating so that the PCW 118 does not boil in the circulation box 109, and melts plastic present in die holes 108 by uniformly warming up the die 106. The die 106 is heated to 200 to 250° C. in order to melt plastic.

CITATION LIST

Patent Literature

PTL 1: JP-A-11-179724

SUMMARY OF INVENTION

Technical Problem

However, it is not possible to avoid the partial boiling of the PCW 118 on the surface of the die 106, and much heat is removed from the die 106 by the latent heat of vaporization of the PCW 118. For this reason, it is difficult to make the temperature of the die 106 uniform. Further, in the circulation box 109, a difference is apt to occur between the temperature of the PCW 118 in the vicinity of the die 106 and the temperature of the PCW 118 at a position distant from the die 106. Furthermore, the PCW 118 stored in the circulation box 109 can be agitated only by the flow behavior of the PCW 118, which is caused by a difference in the temperature of the PCW 118, while the PCW 118 is heated. For this reason, much time was taken to uniformly warm up the die 106 by raising the temperature of the PCW 118. Accordingly, there have been demands for the improvement of work efficiency, which is caused by the uniform warm-up of the die 106 in a short time, and finally the suppression of manufacturing costs.

Moreover, after the circulation box 109 is filled with the PCW 118, the supply of the PCW 118 is stopped and the PCW 118 stored in the circulation box 109 is heated. However, it is not possible to maintain the amount of the PCW 118, which is to be heated, constant and the start time of pelletization varies. For this reason, work efficiency deteriorates, so that an increase in costs is caused.

Further, the molten polymer 117, which stays in the vicinity of the die 106 and uniformly warms up the die 106, is discharged from the die 106 due to its own weight, and the discharged molten polymer 117 is caught by the cutter blades 115 or prevents the cutter blades 115 from coming into contact with the die 106. Accordingly, it was difficult to perform pelletization. For this reason, time was taken to return the cutter blades 115 to a state where the cutter blades 115 can be used in the pelletization, so that the manufacturing costs of the pellets 116 were increased.

Furthermore, in the above-described granulation apparatus 200, the molten polymer 117 is required to be discharged until the start of granulation. For this reason, many persons were required to perform the waste disposal of the molten polymer 117, a large amount of molten polymer 117 should be scrapped, and there were a safety problem and a problem in that manufacturing costs were increased.

The invention has been made to solve the above-described problems and an object of the invention is to provide a granulation method and a granulation apparatus that can reduce the manufacturing costs of pellets.

Solution to Problem

In order to solve the above problems, according to the invention, there is provided a granulation method using an underwater cutting (UWC) device, which is configured to granulate a medium to be processed extruded from holes of a die by cutting the medium by using cutter blades provided in a circulation box and to conveys the cut pellets from the circulation box while cooling the cut pellets by pellet cooling/transport water (PCW), the granulation method comprising: circulating the PCW and stopping the circulation of the PCW after pushing the cutter blades against the die while rotating the cutter blades, before the start of the granulation; storing a predetermined amount of PCW in the circulation box by discharging the PCW; and heating the PCW, which is stored in the circulation box, up to 69° C. or more.

Further, at least one PCW heating temperature detector and at least two level detectors disposed above the PCW heating temperature detector are provided on an upper PCW pipe connected to the upper surface of the circulation box, an automatic drain valve is provided on a lower PCW pipe connected to the bottom of the circulation box, and at least one level detector of the at least two level detectors is disposed above the other level detector. And, the method, when storing the predetermined amount of PCW in the circulation box, further comprises: opening the automatic drain valve; adjusting the level of the PCW by the at least two level detectors; and managing the temperature of the PCW by the at least one PCW heating temperature detector.

Further, a PCW pressure detector is provided on the lower PCW pipe, and a forward pressure controller and a backward pressure controller, which move the cutter blades forward and backward, are provided. And, the method, when storing the predetermined amount of PCW in the circulation box, further comprises: adjusting a contact force between the die and the cutter blades on the basis of the pressure, which is detected by the PCW pressure detector, by the forward pressure controller and the backward pressure controller or any one of the forward pressure controller and the backward pressure controller.

Further, the method, when heating the PCW up to the temperature of 69° C. or more so as to circulate the PCW, further comprises: adjusting a contact force between the die and the cutter blades on the basis of the pressure, which is detected by the PCW pressure detector, by the forward pressure controller and the backward pressure controller or any one of the forward pressure controller and the backward pressure controller.

Further, a distance between the at least two level detectors is 1 m or less.

Further, the automatic drain valve and a manual drain valve are disposed in series in this order from the side of the lower PCW pipe close to the circulation box.

Further, the method, after conveying the pellets from the circulation box, further comprises: continuing the PCW to be circulated so as to lower the temperature of the PCW.

Further, the method, after conveying the pellets from the circulation box, further comprises: making a heating medium heating the die not flow into the die and cooling the die with PCW; and making the UWC device wait without separating the UWC device from the die.

Further, according to the invention, there is provided a granulation apparatus comprising an underwater cutting (UWC) device, which is configured to granulate a medium to be processed extruded from holes of a die by cutting the medium by using cutter blades provided in a circulation box and to convey the granulated pellets from the circulation box while cooling the granulated pellets by pellet cooling/transport water (PCW), the granulation apparatus comprising: a three-way valve configured to circulate the PCW and to switch the circulation of the PCW to a bypass side after pushing the cutter blades against the die while rotating the cutter blades, before the start of the granulation; the circulation box configured to store a predetermined amount of PCW by discharging the PCW; and the die configured to heat the PCW, which is stored in the circulation box, up to 69° C. or more.

Further, the granulation apparatus further comprises: at least one PCW heating temperature detector and at least two level detectors that are provided on an upper PCW pipe connected to the upper surface of the circulation box; an automatic drain valve connected to a lower PCW pipe that is connected to the bottom of the circulation box; and a first control unit configured to: open the automatic drain valve; adjust the level of the PCW by the at least two level detectors; and manage the temperature of the PCW by the at least one PCW heating temperature detector, when storing the predetermined amount of PCW in the circulation box, wherein the at least two level detectors are disposed above the at least one PCW heating temperature detector, and at least one level detector is disposed above the other level detector.

Further, the granulation apparatus further comprises: a PCW pressure detector provided on the lower PCW pipe; a forward pressure controller and a backward pressure controller configured to move the cutter blades forward and backward; and a second control unit configured to control a contact force between the die and the cutter blades on the basis of the pressure, which is detected by the PCW pressure detector, by the forward pressure controller and the backward pressure controller or any one of the forward pressure controller and the backward pressure controller, when storing the predetermined amount of PCW in the circulation box.

Further, when heating the PCW up to a temperature of 69° C. or more so as to circulate the PCW, the second control unit is configured to: control a contact force between the die and the cutter blades on the basis of the pressure, which is detected by the PCW pressure detector, by the forward pressure controller and the backward pressure controller or any one of the forward pressure controller and the backward pressure controller.

Further, a distance between the at least two level detectors is 1 m or less.

Further, the automatic drain valve and a manual drain valve are disposed in series in this order from the side of the lower PCW pipe close to the circulation box.

DESCRIPTION OF EMBODIMENTS

An embodiment of the invention will be described below with reference to the drawings. Incidentally, the description of the same reference numerals as those, which have been described in the background art, will be omitted.

Figure 1:
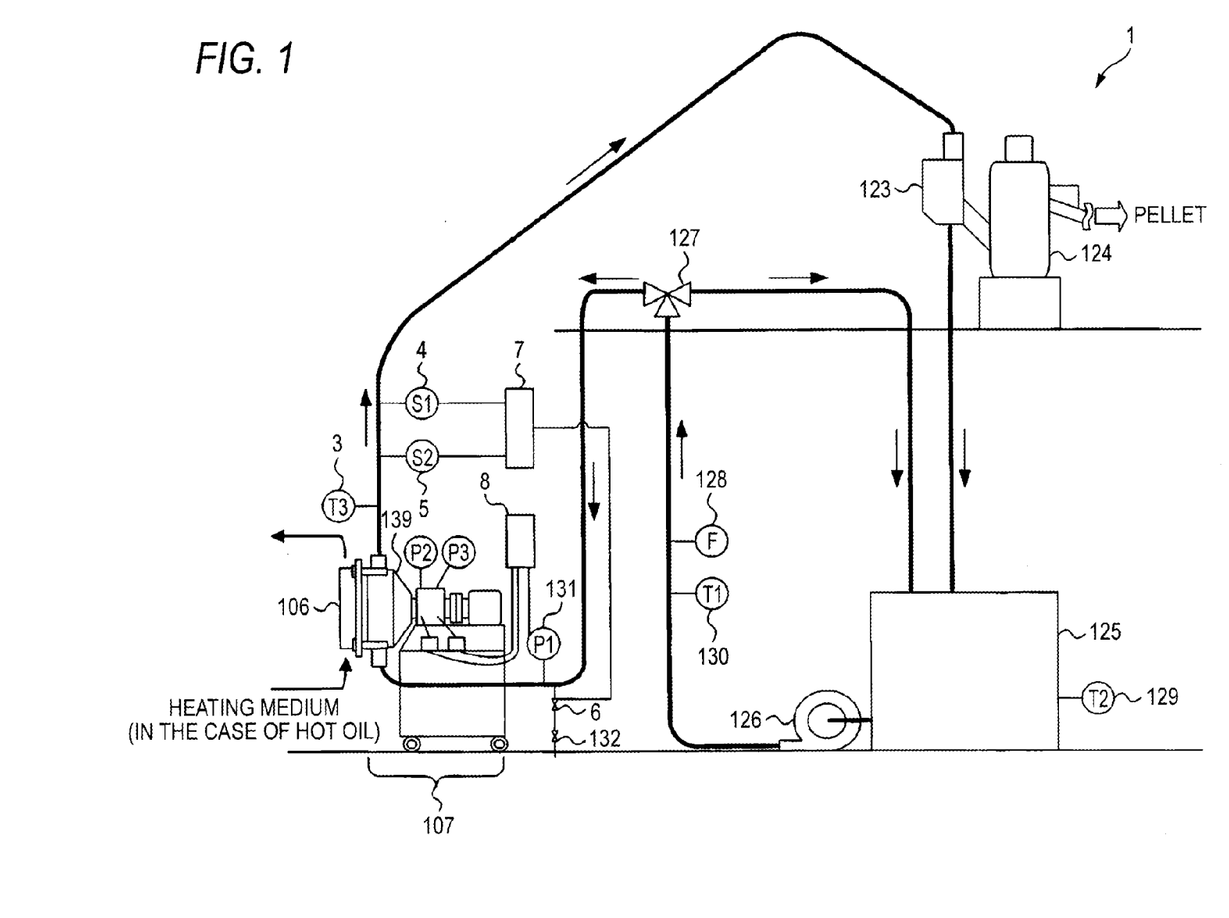
FIG. 1 is a view showing an example of a granulation apparatus according to the present embodiment.

FIG. 1 is a system diagram showing an example of a granulation apparatus 1 according to this embodiment. As shown in FIG. 1, the granulation apparatus 1 includes a PCW heating temperature detector 3, an upper level detector 4, a lower level detector 5, an automatic drain valve 6, a control system (first control unit) 7, a control system (second control unit) 8, a die 106, an UWC device 107, a dehydration screen 123, a centrifugal dehydrator 124, a PCW tank 125, a PCW pump 126, a three-way valve 127, a PCW flow rate detector 128, a detector 129 for internal temperature of the PCW tank, a PCW temperature detector 130, a PCW pressure detector 131, and a manual drain valve 132.

The PCW heating temperature detector 3, the upper level detector 4, and the lower level detector 5 are provided on a pipe (hereinafter, referred to as an upper PCW pipe) that is connected to the upper surface of the UWC device 107. These devices are provided in the order of the PCW heating temperature detector 3, the lower level detector 5, and the upper level detector 4 from the side close to the UWC device 107.

The PCW heating temperature detector 3 is configured to detect the temperature of PCW 118 stored in a circulation box 109 that is heated by the die 106. Incidentally, the die 106 is heated up to 200 to 300° C. by a heating medium (not shown) as described above.

The lower level detector 5 is installed at a position higher than the uppermost portion of the circulation box 109 so that the circulation box 109 is filled with the PCW 118. It is preferable that the upper level detector 4 be provided at a position higher than the lower level detector 5 within 1 m so that the amount of stored PCW 118 is maintained substantially constant on the basis of the PCW discharge rate of the automatic drain valve 6 and the manual drain valve 132. If the upper level detector 4 is provided at a position that is higher than the lower level detector 5 by 1 m or more, a distance between the respective level detectors 4 and 5 is great, so that the amount of stored PCW 118 varies. Thus, it may be difficult to warm up the PCW 118 in a predetermined time.

The automatic drain valve 6 is provided between a pipe (hereinafter, referred to as a lower PCW pipe) connected to the bottom of the circulation box 109 and the manual drain valve 132, and is connected to the manual drain valve 132 in series. The opening and closing of the automatic drain valve 6 is controlled by the control system 7. Incidentally, the manual drain valve 132 is usually opened from the preparation before the operation until the end of operation. However, when safety is regarded as an important factor, it is preferable that the manual drain valve 132 be closed except while PCW is discharged. In this case, it is necessary to open the manual drain valve 132 PCW is discharged.

Each of the control systems 7 and 8 includes a CPU (Central Processing Unit) (not shown) and a memory (not shown). The control system 7 is connected to the upper level detector 4, the lower level detector 5, and the automatic drain valve 6. The control system 7 is configured to control the opening and closing of the automatic drain valve 6 on the basis of information from the respective level detectors 4 and 5.

The control system 8 is connected to the PCW pressure detector 131 and a forward pressure controller 119 and a backward pressure controller 120 shown in FIG. 6 or one of the forward pressure controller 119 and the backward pressure controller 120. The control system 8 is configured to control the forward pressure controller 119 and the backward pressure controller 120 or one of the forward pressure controller 119 and the backward pressure controller 120 on the basis of pressure obtained from the PCW pressure detector 131, and to adjust a contact force between the die 106 and cutter blades 115 shown in FIG. 6.

Next, a method of manufacturing pellets 116 of this embodiment will be described with reference to FIG. 1. Incidentally, members, which form the plastic plasticizing-kneading-extrusion granulator 100 shown in FIG. 5 and the UWC device 107 shown in FIG. 6, may be used in the following description.

First, the UWC device 107 is separated from the die 106, and the die 106 is sufficiently heated by a heating medium such as hot oil. Next, a plastic plasticizing-kneading machine 101 shown in FIG. 5 is started up, molten polymer 117 is discharged to the outside of the system from a diverter valve 102, and cleaning (purging) is performed in the plastic plasticizing-kneading machine 101.

Next, a gear pump 103 shown in FIG. 5 is started up, the diverter valve 102 is switched to the gear pump 103, and it is confirmed that molten polymer 117 is uniformly extruded from die holes 108 shown in FIG. 6.

Then, the diverter valve 102 shown in FIG. 5 is switched to the discharge side outside the system, and the plastic plasticizing-kneading machine 101 and the gear pump 103 are stopped. Incidentally, this state is a state where the molten polymer 117 is not discharged from the diverter valve 102. Further, the UWC device waits until a state where the molten polymer 117 is not discharged from the die holes 108 shown in FIG. 6, the cutting surface of the die 106 is quickly cleaned, a carriage 110 on which the UWC device 107 is mounted is moved toward the die 106, and the circulation box 109 is connected to the die 106.

Subsequently, (1) after a motor 111 of the UWC device 107 is started up to rotate the cutter blades 115, (2) the rotating cutter blades 115 come into contact with the die 106. (3) The three-way valve 127 is switched from a state where the PCW 118 is circulated on the bypass side by the PCW pump 126 shown in FIG. 1 so that the PCW 118 is supplied to the circulation box 109 of the UWC device 107. Incidentally, (3) of this order may be performed first and (1) and (2) may be subsequently performed in this order.

After the PCW 118 starts to be circulated, the three-way valve 127 is switched to the bypass side to stop the circulation of the PCW 118. Further, the control system 7 opens the automatic drain valve 6 and discharges the PCW 118 while acquiring a detection result, where the circulation box is filled with the PCW 118, from the upper level detector 4.

When the control system 7 receives a detection result, where the circulation box is not filled with the PCW 118 and is empty, from the upper level detector 4, the control system 7 closes the automatic drain valve 6 and stops discharging the PCW 118, so that a substantially constant amount of PCW 118 is stored in the circulation box 109. Incidentally, when the control system 7 closes the automatic drain valve 6, it is necessary that the control system 7 acquires a detection result, where the circulation box is filled with the PCW 118, from the lower level detector 5. The reason for this is that a substantially constant amount of PCW 118 is stored in the circulation box 109 when the level of the PCW 118 is higher than the lower level detector 5 and lower than the upper level detector 4.

After that, the UWC device 107 waits until the PCW 118 stored in the circulation box 109 is heated up to 69° C. or more by absorbing heat from the die 106. Here, when the manual drain valve 132 is closed, the amount of PCW 118 stored in the circulation box 109 can be kept substantially constant even if the automatic drain valve 6 is opened due to the occurrence of an abnormality. Accordingly, it is safer that the manual drain valve 132 is closed. Further, while the UWC device 107 waits, the cutter blades 115 continue to rotate. For this reason, the PCW 118 stored in the circulation box 109 is agitated by the cutter blades 115 and uniformly warmed up. Since the surface of the die 106 can be uniformly warmed up in this embodiment, the PCW 118 may boil. Further, since the cutter blades 115 continuously rotate while always coming into contact with the die 106, it is possible to prevent the molten polymer 117, which oozes from the die holes 108 with time, from entangling the cutter blades 115.

Incidentally, while the PCW 118 is heated, the temperature of the PCW 118 stored in the circulation box 109 is managed by the PCW heating temperature detector 3 that is provided at the position lower than the lower level detector 5.

Further, when a predetermined amount of PCW 118 is discharged, the PCW pressure detector 131 installed on the lower PCW pipe of the UWC device 107 detects the pressure of the PCW 118 at a position where the head of the PCW 118 is present at the position between the upper level detector 4 and the lower level detector 5.

Here, when the PCW 118 is discharged, the level of the PCW 118 stored in the granulation apparatus 1 is lowered and pressure in the circulation box 109 is reduced. Accordingly, a force for separating the cutter blades 115 from the surface of the die 106 is reduced. As a result, a contact force between the die 106 and the cutter blades 115 is increased, so that the wear rate of the cutter blades 115, which are worn out by the frictional force between the cutter blades 115 and the die 106, is increased. Accordingly, in order to suppress this increase, the control system 8 feeds back the pressure detected from the PCW pressure detector 131 and automatically adjusts an adequate contact force between the die 106 and the cutter blades 115 by controlling the forward pressure controller 119 and the backward pressure controller 120 or one of the forward pressure controller 119 and the backward pressure controller 120. Further, for this adjustment, a spring force or a magnetic force may be used other than a pressure medium. Only the case of the adjustment using a pressure medium will be described below.

At the time of automatic adjustment, by the same method as the method in the related art, the control system 8 reduces forward pressure when automatically controlling forward pressure and increases backward pressure when automatically controlling backward pressure. A contact force between the die 106 and the cutter blades 115 is reduced by this adjustment, so that it is possible to suppress the excessive wear of the cutter blades 115.

Specifically, the UWC device 107 shown in FIG. 6 includes a sleeve (not shown) that is held rotatably and concentrically with a cutter shaft 112, and a housing 122a in which the cutter shaft 112 is built. Further, voids (not shown) in which a pressure medium is supplied are provided in gaps between the sleeve and the housing 122a. The control system 8 can adjust a contact force between the cutter blades 115 and the die 106 by detecting the pressure of the respective voids with P2 and P3 shown in FIG. 1 and controlling the pressure of the voids with the forward pressure controller 119 and the backward pressure controller 120.

Further, after recognizing that the temperature of the PCW 118 rises up to 69° C. or more from the detection result acquired from the PCW heating temperature detector 3, the control system 8 notifies a system (not shown) that the temperature of the PCW 118 rises up to 69° C. or more. The system (not shown) outputs a signal indicating that a granulation start condition is satisfied.

After that, the plastic plasticizing-kneading machine 101 is started up, and the molten polymer 117 is discharged to the outside of the system. Moreover, the three-way valve 127 is switched to the UWC device 107 from the bypass side to supply PCW 118 to the circulation box 109 of the UWC device 107.

Here, when the PCW 118 starts to be circulated in the granulation apparatus 1, the level of the PCW 118 rises, the pressure of the PCW 118 stored in the circulation box 109 is increased, and a contact force between the die 106 and the cutter blades 115 is reduced. Accordingly, the control system 8 feeds back the pressure of the PCW 118 stored in the circulation box 109, which is detected by the PCW pressure detector 131, and automatically adjusts the cutter blades 115 shown in FIG. 6 by the forward pressure controller 119 and the backward pressure controller 120 or one of the forward pressure controller 119 and the backward pressure controller 120.

At the time of automatic adjustment, the control system 8 increases forward pressure when automatically controlling forward pressure and reduces backward pressure when automatically controlling backward pressure. Since a contact force between the die 106 and the cutter blades 115 is kept at a predetermined value, it is possible to prevent a trouble that pelletization is unable to be performed due to the backward movement of the cutter blades 115.

Finally, the gear pump 103 shown in FIG. 5 is started up and the diverter valve 102 is switched to the gear pump 103, the molten polymer 117 is uniformly extruded from the die holes 108 shown in FIG. 6, and pelletization is started using the cutter blades 115. Formed pellets 116 are conveyed to the dehydration screen 123 or the centrifugal dehydrator 124 by the PCW 118, and the PCW 118 and the pellets 116 are separated from each other, so that the pellets 116 are manufactured.

As described above, in the granulation method according to this embodiment, the plastic plasticizing-kneading machine 101 is stopped while the PCW 118 is stored in the circulation box 109 and warmed up. Accordingly, it is possible to reduce waste disposal work by significantly reducing the amount of wasted molten polymer 117. Accordingly, it is possible to reduce the manufacturing costs of pellets 116.

Further, the cutter blades 115 of the UWC device 107 are rotated immediately after the die 106 and the UWC device 107 are connected to each other. Accordingly, even though a small amount of molten polymer 117 is discharged from the die 106, the molten polymer 117 on the surface of the die 106 is cleaned and removed by the cutter blades 115. For this reason, it is possible to shorten a time that is required until the start of pelletization while the molten polymer 117 at the time of pelletization is not caught by the cutter blades 115 or the cutter blades 115 are not hindered from coming into contact with the die 106. Accordingly, since manufacturing time is shortened, it is possible to reduce the manufacturing costs of the pellets 116.

Further, when the PCW 118 stored in the circulation box 109 absorbs heat from the surface of the die 106, it is possible to forcibly agitate the PCW 118 boiling on the surface of the die 106 by the rotation of the cutter blades 115. Accordingly, it is possible to uniformly warm up the surface of the die 106 in a short time. Therefore, since manufacturing time is shortened, it is possible to reduce the manufacturing costs of the pellets 116.

Furthermore, since it is possible to keep the amount of the PCW 118, which is stored in the circulation box 109 and is heated, substantially constant by using the upper level detector 4 and the lower level detector 5, it is possible to make the start time of pelletization uniform. Accordingly, work efficiency is improved and costs can be reduced.

Moreover, by discharging only an appropriate amount of PCW 118 from the granulation apparatus 1, the pressure of the PCW 118 stored in the circulation box 109 is reduced, so that the molten polymer 117 is easily and uniformly extruded from the die holes 108. Accordingly, it is possible to form pellets 116 having uniform length. Therefore, the yield of the pellets 116 is improved, so that it is possible to reduce the manufacturing costs of the pellets 116.

In addition, since a control unit, which controls the PCW 118 so that the PCW 118 stored in the circulation box 109 does not boil, is not necessary unlike in the granulation apparatus in the related art, it is possible to perform granulation by a simple system. Further, since it is possible to form pellets 116 by a small number of persons, it is possible to reduce overhead costs and to reduce the manufacturing costs of the pellets 116.

In the granulation method according to the embodiment, the circulation of the PCW 118 and cutting using the cutter blades 115 have been performed at different timings. Alternatively, these operations may be performed at the same time. Moreover, the control systems 7 and 8 have been shown as separate systems in FIG. 1, but the control of the control systems 7 and 8 may be performed by one control system. The reason for this is to perform granulation by simpler processes and devices.

Further, the automatic pressure control of the cutter blades 115 may be adjusted so that the pressure of the PCW 118 gradually increasing together with the circulation of the PCW 118 is always fed back to the control system 8. Furthermore, when the pressure of the PCW 118 at the time of the circulation of the PCW 118 is known in advance, it may be performed such that the three-way valve 127 is switched to the UWC device 107, the PCW 118 is supplied to the circulation box 109, and the pressure of the PCW 118 is adjusted to a predetermined pressure by the control system 8 so that the cutter blades 115 are not moved backward.

Moreover, when granulation is ended and pelletization is stopped, the PCW 118 may continue to be circulated, and a heating medium heating the die 106 may be made not to flow into the die 106. Since the die 106 is cooled through the circulation of the PCW 118, the molten polymer 117 filling the die holes 108 is cooled and the outflow of the molten polymer 117 is suppressed. Accordingly, since the UWC device 107 can resume granulation without being separated from the die 106, it is possible to save time and effort for connecting the UWC device 107 to the die 106.

Further, in this embodiment, an aspect where two level detectors are provided has been described. Alternatively, three or more level detectors may be provided. Furthermore, in this embodiment, an aspect where one PCW heating temperature detector 3 is provided has been described. Alternatively, two or more PCW heating temperature detectors may be provided. Since it is possible to detect the change of the level of the PCW 118 or the change of temperature in detail, it is possible to further stabilize the state of the PCW 118 that is stored in the circulation box 109.

Furthermore, a granulation method, which uses molten polymer 117 as a medium to be processed, has been described in this embodiment, but the invention may be applied to the granulation of synthetic rubber or the like.

EXAMPLES

1. Various resins having different melt flow rates (MFR) were granulated using various granulation methods, and a die hole-aperture ratio was examined.

Example 1

The aperture ratio of the die holes was measured using the granulation apparatus according to this embodiment by the granulation method according to this embodiment. The raw material of molten polymer, the UWC device, the die, die heating temperature, the number of the cutter blades, initial PCW temperature, throughput, the rotational speed of the cutter blades, and the temperature of a resin on the upstream side immediately ahead of the die were used as the following conditions and evaluation was performed.

Raw material of molten polymer: polypropylene (MFR=0.25 (230° C., 2.16 kg load))

UWC device: ADC-10 model manufactured by Japan Steel Works, Ltd.

Die: heat channel die (diameter of hole: $\phi$2.5 mm, the number of holes: 24)

Die heating temperature: 300° C. (oil heating, setting value of heat medium heating device)

The number of cutter blades: 6

Initial PCW temperature: 60° C.

Throughput: 380 kWh

The rotational speed of cutter blades: 2200 rpm

The temperature of a resin on the upstream side immediately ahead of the die: 213° C.

Figure 2:
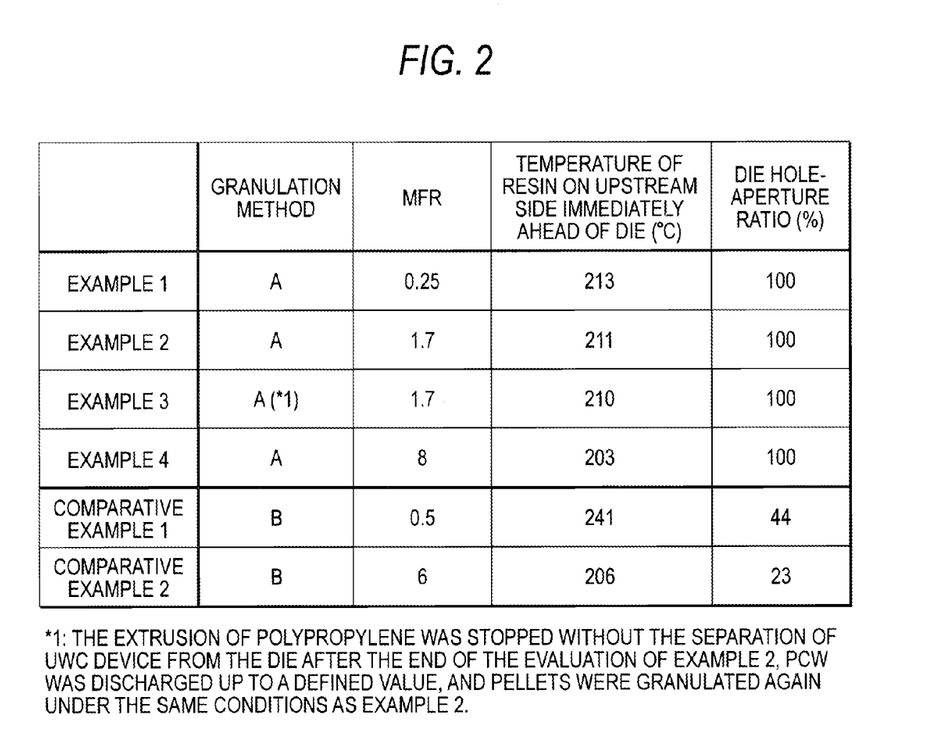
FIG. 2 is a table showing the results of Examples 1 to 4 and Comparative Examples 1 and 2.

After the temperature of PCW rose to 85° C. from 60° C., granulation was started. Incidentally, a die hole-aperture ratio in this example was calculated using the following expression.

$$\text{Die hole-aperture ratio (\%)} = \text{Throughput (g/min)} \times 100 / (\text{the number of cutter blades} \times \text{the rotational speed of cutter (rpm)} \times \text{the number of die hole} \times \text{average pellet weight (g/piece)}) \quad \text{[Expression 1]}$$

Pellet weight for the expression was obtained by randomly collecting fifty pellets, which had been formed, and calculating the average weight per pellet through the measurement of the weights of the fifty pellets. Further, this measurement was performed two times, and the average value of the first and second calculation results was used as the pellet weight. This result is shown in FIG. 2. Incidentally, in FIG. 2, a granulation method A shows the granulation method according to this embodiment.

Examples 2 to 4

Granulation was performed under the same conditions as Example 1 except that the MFR value of polypropylene and the temperature of a resin on the upstream side immediately ahead of the die were used as conditions shown in FIG. 2, and a die hole-aperture ratio was evaluated. Incidentally, in Example 3, the extrusion of polypropylene was stopped without the separation of the UWC device from the die after the end of the evaluation of Example 2, PCW was discharged up to a defined value, and pellets were evaluated again under the same conditions as Example 2. These results are shown in FIG. 2.

Comparative Examples 1 and 2

Granulation was performed under the same conditions as Example 1 except that PCW was not heated by the circulation box and the conditions shown in FIG. 2 were used while PCW of 60° C. was circulated in the granulation apparatus at a flow rate of 10 m$^3$/h, and a die hole-aperture ratio was evaluated. These results are shown in FIG. 2. Incidentally, in FIG. 2, a granulation method B shows the granulation method in the related art under the above-described conditions.

In FIG. 2, it was possible to granulate polypropylene having a MFR in the range of 0.25 to 8 at an aperture ratio of 100% without the clogging of the die holes by using the granulation method according to the invention. In addition, when Example 1 was compared with Comparative Example 1, it was possible to granulate a resin having a low MFR at a die hole-aperture ratio of 100% even under the condition where the temperature of a resin on the upstream side immediately ahead of the die was low.

2. A relationship between a die hole-aperture ratio and the temperature of PCW stored in the circulation box immediately before the start of granulation was examined.

Example 5

Figure 3:
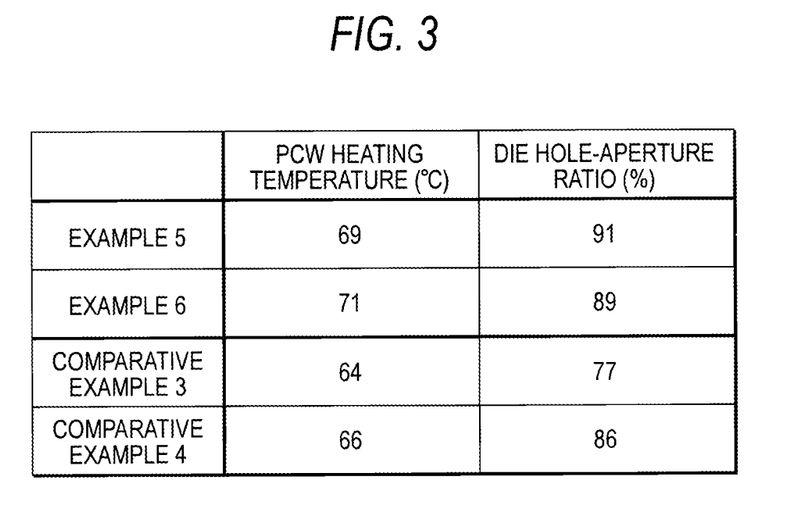
FIG. 3 is a table showing the results of Examples 5 and 6 and Comparative Examples 3 and 4.

Granulation was performed by the same method as Example 1 except that the raw material of molten polymer, the UWC device, the die, die heating temperature, the number of the cutter blades, initial PCW temperature, PCW heating temperature, throughput, the rotational speed of the cutter blades, and the temperature of a resin on the upstream side immediately ahead of the die were set to the following conditions; and an aperture ratio of the die holes was measured. This result is shown in FIG. 3.
Raw material of molten polymer: polypropylene (MFR=5 (230° C., 2.16 kg load))
UWC device: ADC-10 model manufactured by The Japan Steel Works, Ltd.
Die: heat channel die (diameter of hole: ϕ2.5 mm, the number of holes: 56)
Die heating temperature: 300° C. (oil heating, setting value of heat medium heating device)
The number of cutter blades: 4

Initial PCW temperature: 60° C.
PCW heating temperature: 69° C.
Throughput: 570 kg/h
The rotational speed of cutter blades: 2100 rpm
The temperature of a resin on the upstream side immediately ahead of the die: 194° C.

Example 6 and Comparative Examples 3 and 4

Granulation was performed under the same conditions as Example 5 except that PCW heating temperature was set to values shown in FIG. 3, and a die hole-aperture ratio was evaluated. These results are shown in FIGS. 3 and 4.

Figure 4:
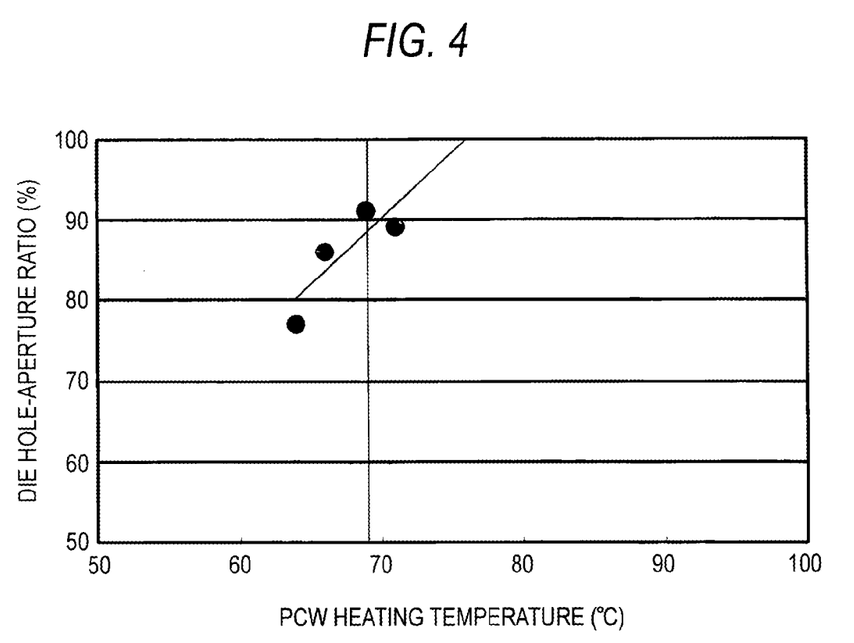
FIG. 4 is a view showing the dependency of a die hole-aperture ratio on PCW heating temperature.

In FIGS. 3 and 4, a die hole-aperture ratio was increased to 89% or more when PCW heating temperature was set to 69° C. or more. Here, since a machine is usually designed so as to have an allowance of about 10% of required capacity, required capacity can be achieved if a die hole-aperture ratio is about 90% or more. Accordingly, in the case of polypropylene of which an MFR is 5, the capacity of the machine is achieved when PCW heating temperature is set to 69° C. or more.

The invention is not limited to the above-described embodiment, and may appropriately have modifications, improvements, and the like. In addition, since the materials, the shapes, the dimensions, the numerical values, the forms, and the number of the respective components of the above-described embodiment, the places where the respective components of the above-described embodiment are disposed, and the like are arbitrary, they are not limited as long as the invention is achieved.

The invention has been described in detail with reference to a specific embodiment, but it is apparent to those skilled in the art that various changes or alterations can be added to the invention without departing from the spirit and scope of the invention.

This application is based on Japanese Patent Application (Japanese Patent Application No. 2010-111657) filed May 14, 2010, the content of which is incorporated herein by reference.

Industrial Applicability

According to the invention, it is possible to reduce the manufacturing costs of pellets.

Reference Signs List

1: Granulation apparatus
3: PCW heating temperature detector
4: Upper level detector
5: Lower level detector
6: Automatic drain valve
7: Control system (first control unit)
8: Control system (second control unit)
106: Die
107: Underwater cutting (UWC) device
108: Die holes
109: Circulation box
115: Cutter blade
119: Forward pressure controller
120: Backward pressure controller
131: PCW pressure detector
132: Manual drain valve

The invention claimed is:

1. A granulation method using an underwater cutting (UWC) device, which is configured to granulate a medium to be processed extruded from holes of a die by cutting the medium by using cutter blades provided in a circulation box and to conveys the cut pellets from the circulation box while cooling the cut pellets by pellet cooling/transport water (PCW), the granulation method comprising:
    circulating the PCW and stopping the circulation of the PCW after pushing the cutter blades against the die while rotating the cutter blades, before the start of the granulation;
    storing a predetermined amount of PCW in the circulation box by discharging the PCW; and
    heating the PCW, which is in the circulation box, up to 69° C. or more.

2. The granulation method according to claim 1,
wherein at least one PCW heating temperature detector and at least two level detectors disposed above the PCW heating temperature detector are provided on an upper PCW pipe connected to the upper surface of the circulation box, an automatic drain valve is provided on a lower PCW pipe connected to the bottom of the circulation box, and at least one level detector of the at least two level detectors is disposed above the other level detector, and
wherein the method, when storing the predetermined amount of PCW in the circulation box, further comprises:
    opening the automatic drain valve;
    adjusting the level of the PCW by the at least two level detectors; and
    managing the temperature of the PCW by the at least one PCW heating temperature detector.

3. The granulation method according to claim 2,
wherein a PCW pressure detector is provided on the lower PCW pipe, and a forward pressure controller and a backward pressure controller, which move the cutter blades forward and backward, are provided, and
wherein the method, when storing the predetermined amount of PCW in the circulation box, further comprises:
    adjusting a contact force between the die and the cutter blades on the basis of the pressure, which is detected by the PCW pressure detector, by the forward pressure controller and the backward pressure controller or any one of the forward pressure controller and the backward pressure controller.

4. The granulation method according to claim 3,
wherein the method, when heating the PCW up to the temperature of 69° C. or more so as to circulate the PCW, further comprises:
    adjusting a contact force between the die and the cutter blades on the basis of the pressure, which is detected by the PCW pressure detector, by the forward pressure controller and the backward pressure controller or any one of the forward pressure controller and the backward pressure controller.

5. The granulation method according to claim 2,
wherein a distance between the at least two level detectors is 1 m or less.

6. The granulation method according to claim 2,
wherein the automatic drain valve and a manual drain valve are disposed in series in this order from the side of the lower PCW pipe close to the circulation box.

7. The granulation method according to claim 1,
wherein the method, after conveying the pellets from the circulation box, further comprises:
    continuing the PCW to be circulated so as to lower the temperature of the PCW.

8. The granulation method according to claim 7,
wherein the method, after conveying the pellets from the circulation box, further comprises:
    making a heating medium heating the die not flow into the die and cooling the die with PCW; and
    making the UWC device wait without separating the UWC device from the die.

* * * * *